Jan. 18, 1949.  V. WEBER  2,459,349
MOTOR CONTROL SYSTEM WITH LATCHING RELAYS
Filed May 31, 1943  3 Sheets-Sheet 1
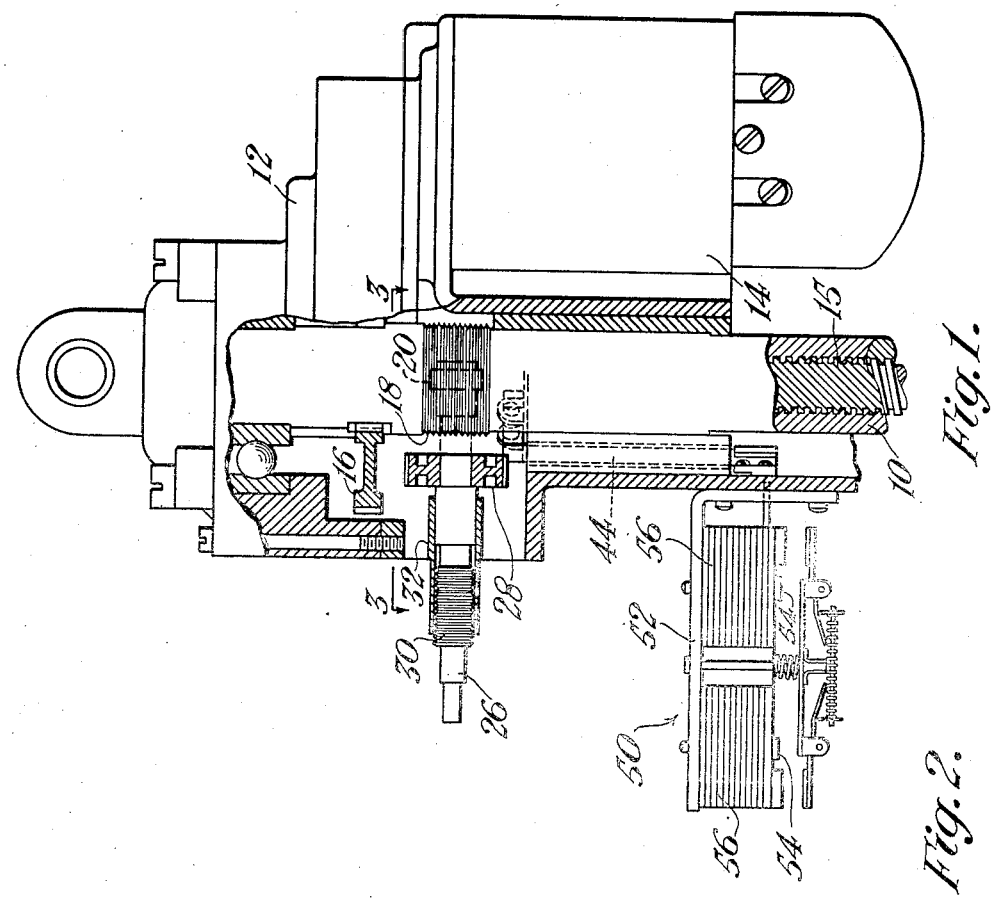
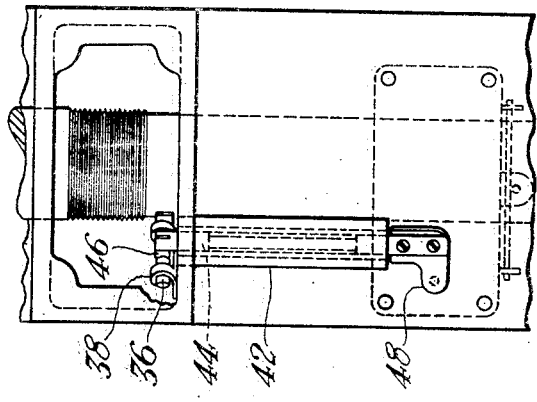
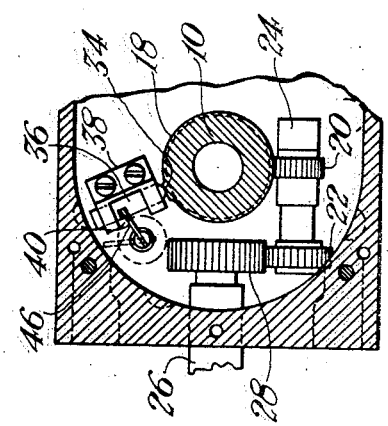
INVENTOR
*Victor Weber*
BY
*Albal J. Henderson*
HIS ATTORNEY INVENTOR
Victor Weber
BY Albert J. Henderson
HIS ATTORNEY INVENTOR
Victor Weber
BY
HIS ATTORNEY Patented Jan. 18, 1949

2,459,349

UNITED STATES PATENT OFFICE 2,459,349

MOTOR CONTROL SYSTEM WITH LATCHING RELAYS

Victor Weber, Greensburg, Pa., assignor to Robertshaw-Fulton Controls Company, a corporation of Delaware Application May 31, 1943, Serial No. 489,180

15 Claims. (Cl. 318—31)

1

This invention relates to electromagnetic devices such as relays and, more particularly, to latching devices therefor.

The prime object of this invention is to eliminate fluttering of a relay armature between attracted and released poitions.

Another object of the invention is to obtain positive and prompt response of the armature to energization and deenergization of the coils.

Another object of the invention is to insure safe operation by positive acting means for releasing the latch when required.

Another object of the invention is to enable electromagnetic switching devices to be used for alternating or direct current circuits.

Other objects and advantages will become apparent from the following description taken in connection with the accompanying drawings, wherein:

Fig. 1 is a front elevation, partly in section, of an electric motor-driven device having one form of my invention applied thereto;

Fig. 2 is a side elevation of a portion of the structure shown in Fig. 1;

Fig. 3 is a section taken on the line 3—3 of Fig. 1;

Figure 4:
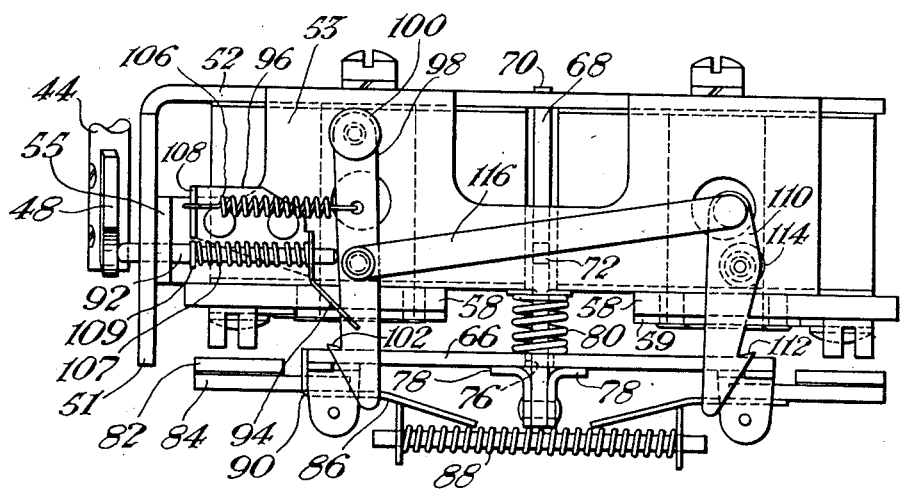
Fig. 4 is an enlarged side elevation of the relay structure as included in the embodiment of Fig. 1.
Figure 5:
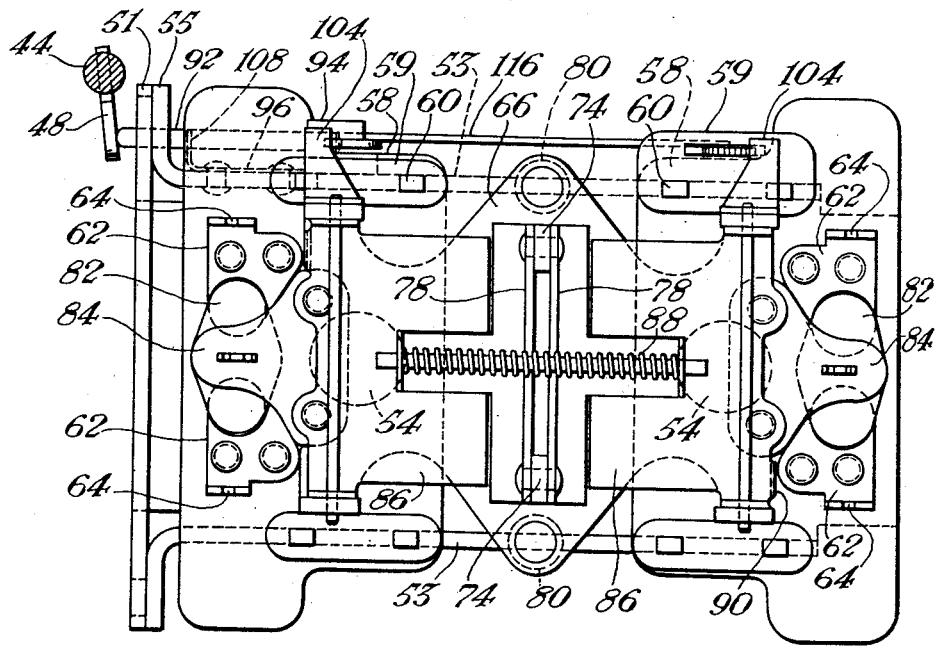
Fig. 5 is a plan view of the same relay structure.

The device of this invention finds a field of use in connection with electric motor driven apparatus where the motor current is conveyed through relays. It will be apparent hereinafter that the embodiments shown and described are purely exemplary and the invention is not to be deemed limited thereto.

Referring more particularly to Figs. 1 to 3 of the drawings, a shaft 10 is mounted in a housing 12 to be driven in either clockwise or counter-clockwise direction by means of an electric motor 14 capable of revolving in either direction. The shaft 10 includes a jack screw 15 which may be attached to any operated mechanism, such as a shutter, and will reciprocate upon rotation of the shaft. Suitable reduction gearing, which includes the gear 16 keyed to the shaft 10, may be interposed between the motor 14 and shaft 10 to effect rotation thereof at a desired speed.

In this embodiment, the shaft 10 is provided with a portion forming a worm 18 which is cooperative with worm and intermediate gears 20 and 22 respectively. The gears 20 and 22 are carried on a jack shaft 24 rotatably mounted in the housing 12 and serve to drive a spindle 26

2 through the interposition of a spur gear 28 thereon engaging with the intermediate gear 22. The spindle 26, which extends transversely of the rotatable shaft 10, is provided with a threaded portion 30 which engages with the threaded bore of a bonnet portion 32 secured to the housing 12. Hence, upon rotation of the shaft 10, the spindle 26 will travel inwardly or outwardly of the housing 12 depending upon the direction of rotation imparted thereto by the gearing described. The purpose of the travelling spindle will be made apparent in connection with the description of Fig. 6 which follows later in this specification.

Preferably located immediately below the worm 18 on the shaft 10 is a cam element 34 which may be integral with the shaft and is adapted to engage intermittently upon rotation thereof with a reciprocably mounted pin 36 carried by a bearing 38 secured to the housing 12. The pin 36 has its median portion exposed in the bearing 38 and is provided with a slot 40 in one side of the exposed portion. The housing 12 carries an elongated bearing portion 42 extending substantially parallel with the shaft 10 and within which a connecting stem 44 is journaled. The upper end of the stem 44 projects from the bearing portion 42 and carries a transverse lug 46 which extends into the slot 40. The opposite end of the stem 44 also extends beyond the bearing portion 42 and carries a similar transverse lug 48 which is, however, located substantially at right angles to the lug 46. It will be apparent that as the shaft 10 rotates, the cam 34 will engage the pin 36 upon every revolution causing outward movement thereof and consequent arcuate movement of the lug 46 and, through the stem 44, corresponding arcuate movement of the lug 48. It will furthermore be apparent that additional cam elements may be provided on the shaft 10 to impart the described movement to the pin 36 at more frequent intervals if desired.

The arcuate movement of the lug 48 affords convenient means for operating the latching device of this form of the invention, as will now be described. To this end, an electromagnetic switching device or relay 50 is mounted on the housing 12 adjacent the lug 48 but spaced therefrom. The relay 50 which is fully described and claimed in my copending application, Serial No. 476,395, filed February 19, 1943, now matured into Patent No. 2,398,681, issued April 16, 1946, may comprise a base 52 having an upturned end 51 by which it is secured to the housing 12 and upturned sides 53 forming a channel section. The sides adjacent the end 51 have attaching lugs 55 welded or otherwise secured to the end 51. The relay frame thus formed provides a housing for two cores 54 spaced one from the other on the base 52 and having the usual coils 56 thereround.

It will be observed that the relay of this embodiment is of the double-throw type and that for the purposes of clarity similar reference numerals have been used to identify similar parts.

Surmounting each coil 56 is a sheet of insulating material 58 which is secured in position by spaced prongs 60 projecting from the base 52. To prevent tearing of the insulation, metal clamping plates 59 are provided for the prongs 60 and over which the ends thereof may be peened and soldered. It may be observed that one plate extends beyond the edge of the insulation and is apertured for a purpose apparent hereinafter. Secured to the upper surface of each insulating sheet 58 is a plurality of contact elements 62, there being two such contacts for each insulating sheet 58 secured thereto in spaced relation on either side of the longitudinal axis of the sheet 58. Each contact element 62 is preferably provided with an associated terminal 64 for connection into the electrical circuit with which the relay is used. As the cores 54 of the electromagnet have their exposed surfaces in substantially the same plane as the contacts 62, the insulating sheets 58 are suitably perforated to permit the cores 54 to extend therethrough.

A plate 66 extends across the upper surfaces of both cores 54 and forms a common armature for the electromagnetic device. This plate or armature 66 is adapted to occupy a neutral position disengaged from the cores 54 when both magnets are deenergized; to engage one or the other of the cores 54 when either magnet is energized; but it is not permitted to engage both cores 54 simultaneously. To this end the armature 66 is mounted on a support 68 in the form of a plate projecting between the magnets normal to the base 52 and being provided with end prongs 70 by means of which it is secured in position on the base 52 and side prongs 72 engaging the sides 53 to preclude tilting.

The armature support 68 also has a pair of projections 74 on the end opposite the base prongs 70 located one on each side thereof and extending through apertures 76 formed in the median portion of the armature 66. The apertures 76 are made sufficiently larger in area than the projections 74 in order that the armature 66 may both tilt and move bodily with respect to its support, although the latter movement is restricted as will hereinafter appear. Secured one on each side of the projections 74 is a pair of angle strips 78 each having one side projecting outwardly from the armature support 68 and engaging the exposed surface of the armature 66. The angle strips 78 are so arranged that when the surface of the armature 66 is in contact therewith the underside of the armature 66 is slightly spaced from the top of the support 68. Owing to the clearance provided at this point and also between the projection 74 and the apertures 76, as described, the armature may tilt or rock about the support 68 when attracted by one or the other of the electromagnets. The outwardly projecting sides of the angle strips 78 provide spaced fulcrums for such movement.

The armature 66 is normally retained in the neutral position with the opposite ends thereof spaced substantially equal distances from the upper surfaces of the cores 54 by a pair of coil springs 80 which extend on either side of the support 68 between the underside of the armature 66 and the edge of the sides 53 of the relay frame. Thus, the springs normally bias the armature 66 toward the fulcrum provided therefor by the angle strips 78 until the armature is attracted by one or the other of the electromagnets, whereupon the springs 80 yield to permit pivotal movement of the armature 66.

In this embodiment, movable contacts 82 associated with the armature 66 are carried on insulating strips 84 secured to brackets 86 pivotally mounted on the ends of the armature 66. It will be apparent that the contacts 82 could equally well be mounted directly upon the armature 66 if desired. However, the brackets 86 and the insulating strips 84 form the take-up arms of the relay assembly and a compression spring 88 extends therebetween and maintains a depending flange 90 on each bracket normally in engagement with the adjacent end of the armature 66. The take-up arm construction provides that both in engaging and separating from the fixed contacts 62, the movable contacts 82 undergo slight sliding motion thereacross due to the pivoting of the bracket 86 and compression of the spring 88 when the contacts engage.

As previously indicated, this invention is more particularly concerned with means to latch the armature 66 in desired positions at appropriate times. In this embodiment it is desirable to effect latching with the armature in attracted position with either one of the magnets and to release it for return to neutral position. Accordingly, the upturned end portion 51 of the base 52 and one of the lugs 55 which is secured thereto are perforated for the reception of a pin 92 which is mounted therein for reciprocation in a path substantially parallel with the side 53 of the relay frame. One end of the pin projects from the side 51 of the relay frame and is adapted to be engaged by the lug 48 which is moved in an arcuate path by the connecting stem 44. The opposite end of the pin 92 projects through and is supported in a suitably apertured upturned flange 94 of a support arm 96 which is rigidly secured to the side 53 of the relay frame. This projecting end of the pin 92 engages with the median portion of latching arm 98 extending substantially parallel with the end flange 51 of the relay frame and movable in an arcuate path relative thereto. The arm 98 is pivotally mounted for such movement on the side 53 of the frame and is spaced therefrom by means of a collar 100 through which the pivot extends. The arm 98 is further supported against movement laterally of the frame by the flange 94 which is slotted for its reception. The arm 98 thus supported is located in such position on the side frame 53 that a catch 102 thereon will engage with a catch plate 104 projecting laterally from the related end of the armature 66. A tension spring 106 extends between the arm 98 and a flange 108 formed on the support arm 96 parallel with, but on the opposite end to, the flange 94. The pin 92 is also yieldably mounted by provision of a compression spring 107 operable between the flange 94 and an abutment 109 formed on the pin 92 adjacent the end flange 55 of the relay frame.

The opposite end of the armature 66 is also adapted to be latched in attracted position and, for this purpose, carries a second catch plate 104 in all respects identical with the catch plate similarly identified and located at the opposite end of the armature 66. A latching arm 110 having a catch 112 formed thereon for engagement with the second catch plate 104 is pivotally mounted at its median portion on the side 53 of the relay casing and spaced therefrom by means of a collar 114 through which the pivot extends. Lateral movement of this arm is restricted by its engagement with the walls of a slot in the adjacent one of the insulation clamping plates 59 through which the arm extends. A cross arm 116 serves to connect the arms 98 and 110 together and for this purpose is pivotally mounted at one end on the arm 98 intermediate the pivot and the catch thereon and is also pivotally mounted on the arm 110 at the terminal end opposite the catch 112. The portion of each arm 98 and 110 surmounting the catch is tapered so that the armature catch plates will ride thereon before the catches engage. Thus, when the armature 66 occupies a neutral position the tension spring 106 will cause the arms 98 and 110 to spread apart and the tapered portion of the catch associated with each arm will engage with the respective catch plate 104 on the ends of the armature 66. The tilting movement of the armature when attracted by one or the other magnet will suffice to overcome the bias of spring 106 and move the arm sufficiently for the catch to engage.

Figure 6:
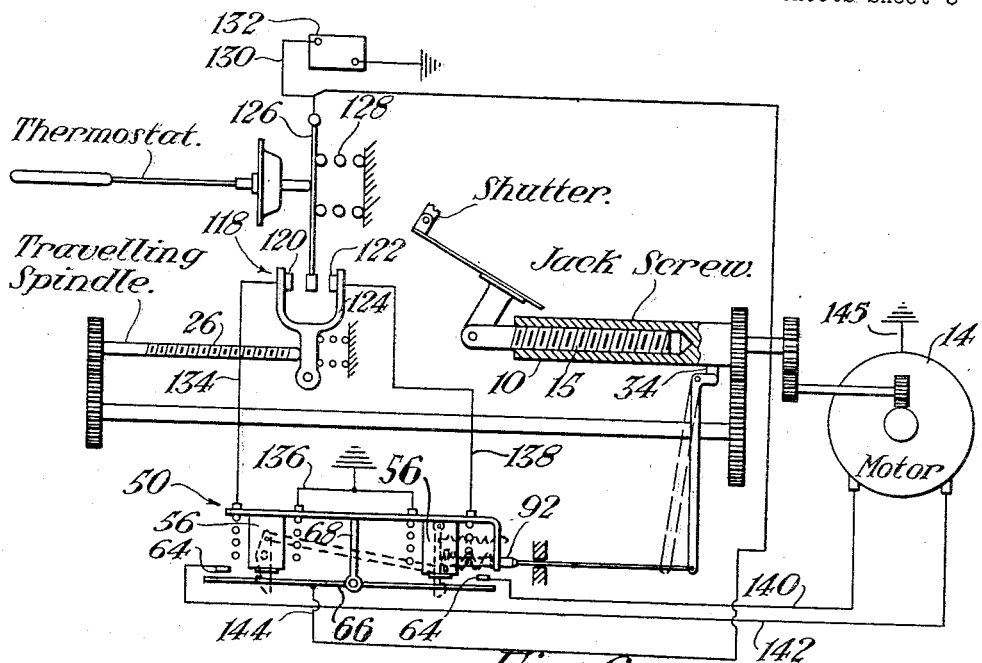
Fig. 6 is a schematic view of one application of the invention to a temperature controlling device in conjunction with a wiring diagram of the electrical circuit used therewith.

Referring now to Fig. 6 of the drawings, although the relay structure is shown in schematic form in conjunction with a thermostatic control mechanism and wiring diagram therefor, the same reference characters have been employed as far as possible in connection with this portion of Fig. 6 as were used in the description of the relay and motor driven structure in connection with the previous figures of the drawings. It is believed that from the previous description the relation of the various elements in Fig. 6 will readily be apparent and no detailed description of the same will be required.

In this schematic embodiment, the jack screw 15 is connected to a shutter or cowl flap mechanism, such as may be incorporated in an aircraft to control the influx of air circulating about the engine radiator thereof. Movements of the shutter may be thermostatically controlled through a control switch 118 having oppositely disposed contacts 120—122 carried on a contact arm 124 which is mounted for pivotal movement and is adapted for engagement with the travelling spindle 26 driven from the motor 14, as previously described. The thermostat is adapted to engage a movable switch blade 126 and moves it against bias of a spring 128 into engagement with contact 122, when the thermostat expands upon becoming heated. When the thermostat is satisfied the switch blade occupies a neutral position with respect to contacts 120—122. Upon sufficient cooling of the thermostat, the switch blade 126 may engage with contact 120 due to the bias of the spring 128 described. As fully described in my copending application Serial No. 479,215, filed March 15, 1943, now abandoned, the spindle 26 makes an almost complete revolution during the time that the shutter moves between full open and full closed positions. The shaft 10, however, revolves at a much faster rate and completes several revolutions during this period.

The switch blade 126 is electrically connected by a wire 130 with one terminal of a battery 132 or other source of electric current, the other terminal of the battery being grounded. Contact 120 of the contact arm 124 is connected by a wire 134 to one terminal of one of the relay coils 56, the other terminal of which is connected by a common wire 136 which grounds both relay coils and is connected with one terminal of the other relay coil 56. The opposite terminal of the other relay coil 56 is connected by a wire 138 to the contact 122 of the contact arm 124. The circuit from the relay 50 to the motor 14 may be completed by the wires 140—142 extending from one terminal 64 at each end of the armature to the motor terminals and by a common wire 144 which connects the armature 66 to wire 130 from terminal 132 of the battery. A wire 145 serves to ground the motor.

In the operation of the device shown in Fig. 6, the thermostat may be cold and switch blade 126 will then engage contact 120 of the contact arm 124. A circuit is then established by way of the connections described through the relay 50 to energize the motor 14 and operate the jack screw 15 in the closing direction of the shutter. However, during this operation of the motor 14 the travelling spindle 26 is reciprocated tending to separate contact 120 from switch blade 126. A similar operation will occur after the shutter has been closed for a period of time and the thermostat is sufficiently heated to move the switch blade 126 to the right, as viewed in Fig. 6, causing engagement with contact 122. A circuit through the right-hand coil 56 of the relay is established and the direction of rotation of the motor 14 is reversed to move the spindle 26 longitudinally to the right, as viewed in Fig. 6, pivoting the contact arm 124 and tending to separate the contact 122 from the switch blade 126. After the shutter has moved in this opening direction a certain amount, the spindle 26 will have moved the contact arm 124 on its pivot far enough to the right, as viewed in Fig. 6, to separate the contact 122 from switch blade 126, it being assumed that the thermostat has ceased expanding and the switch blade 126 is stationary. In such event, the relay coil 56 becomes deenergized releasing the armature 66 and opening the contacts 64 to cause deenergization of the circuit of the motor 14.

As it is contemplated that the motor 14 may be suitable to be energized by direct current, it will be apparent that the movement of the contact arm 124 as described to open the contact 122 with a graduating action will tend to produce a slight arc between contact 122 and switch blade 126. Such arcing effect may be momentarily sufficient to cause retention of the relay armature 66 in its attracted position and immediately thereafter may be insufficient to cause it to retain such position. A chattering of the armature will then result and the latching device of this invention is designed to eliminate such occurrence and maintain the armature stabilized.

Thus, upon movement of the armature 66 into attracted position with either of the coils 56, the laterally extending flange 104 rides downwardly on the tapered surface of the latch arm 98 or 110, as the case may be, until the notch 102 or 112 thereon is snapped over the latch plate by action of the spring 106 and serves to retain the armature 66 in its attracted or tilted position. It will be observed that the latch arms 98 and 110 are always biased towards the latching position and that upon sufficient tilting movement of the armature 66 in either direction about its pivot 78 it becomes firmly secured in attracted position until the latch is released.

Further operation of the motor 14 will cause the spindle 26 to move the contact arm 124 sufficiently to the right to complete the separation of the contact 122 from the switch arm 126. After the contacts are definitely separated the relay is deenergized and at such time it is feasible to release the latch with assurance that no chattering of the armature can occur. Accordingly, the cam 34 is located on the shaft 10 in such relation to the radial position of the pin 36 which it is designed to operate so that after the spindle 26 has travelled a certain distance the lug 48 will operate the pin 92 against the pressure of spring 107 to overcome the bias of the spring 106 and move the latch arm 98 sufficiently to release the armature 66 from latched engagement. In the embodiment shown and described, a single cam 34 is used and hence the shaft 10 may complete one revolution before the latch is released. The degree of revolution of the shaft 10 before cam 34 operates the latch is, of course, dependent upon the relative positions of the latch and cam when rotation of the shaft commences. It will be apparent that two or more cams could be used thus reducing the extreme degree of rotation of the shaft 10 to less than one revolution before the latch is released. In any event, even if the thermostat is satisfied and further movement of the shutter is not required, the completion of the revolution of shaft 10 to release the latch will not cause an increased shutter action of any consequence due to the greater speed of shaft 10 relative to spindle 26 as described. It will furthermore be apparent that upon movement of the arm 98 by the pin 92 the cross arm 116 will cause corresponding movement of the arm 110, that is, the arms 98 and 110 always move together towards each other when the tension of spring 106 is overcome. Consequently, in the event that the latch arm 110 is engaged with the latch plate 104 at the related end of the armature 66, then movement of the pin 92 as described will cause arm 110 to be moved to released position as in the case of arm 98. The full pressure of the armature springs 88 will then be applied to return the armature to its neutral position.

The latching device of this invention will operate equally well regardless of the direction of rotation of the shaft 10 by the motor 14. The release of the latch is not dependent on spring action because the tension of spring 106 is overcome by positive acting means in the form of reciprocal movement of the pin 92. It will furthermore be apparent that although the device finds a full field of usefulness in cases where direct current is used, it is equally applicable to cases where alternating current is used.

Figure 7:
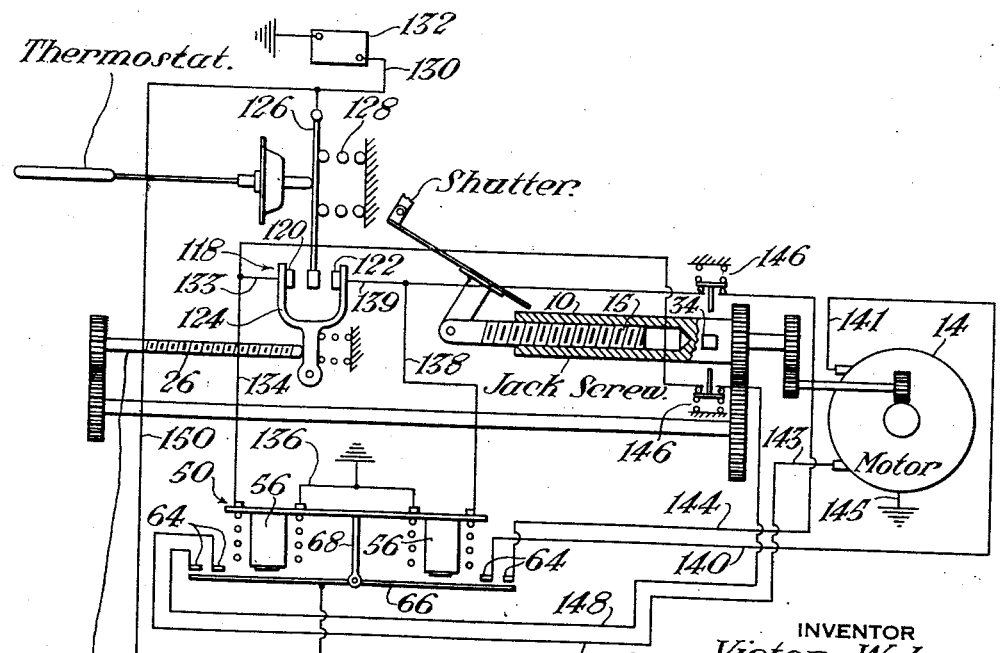
Fig. 7 in a similar schematic view of an alternate form of the invention.

Referring now to Fig. 7, an alternative means for maintaining the armature 66 in attracted position irrespective of fluctuations of the main switch 118 between open and closed positions are provided. In this alternative form, the mechanical latch disclosed in the previously described embodiment is replaced by an electrically operated latching means which will serve the same purpose. It will be apparent that as only the latching elements attached to the relay 50 and the means for connecting such elements to the shaft 10, as shown in Fig. 6, are dispensed with, it is feasible to use similar reference characters for parts which correspond in Figs. 6 and 7. Accordingly, parts common to the structures shown in Figs. 6 and 7 in the schematic form are identified by similar reference numerals, as will be apparent as this description proceeds.

The thermostatically operated switch blade 126 is again connected by a wire 130 to one terminal of the battery 132 or other source of electric current, the other terminal of the battery being grounded. Contact 120 of the contact arm 124 is connected by a wire 133 to a wire 134 which connects with one terminal of one of the relay coils 56. The other terminal of this same relay coil 56 is connected by a common wire 136 which grounds both the relay coils and is connected with one terminal of the other relay coil 56. The opposite terminal of this other relay coil 56 is connected by a wire 138 to a wire 139 which is connected to contact 122 of the contact arm 124.

One of the pair of terminals 64 at one end of the armature 66 is connected to the motor 14 by wires 140—141 and a corresponding terminal 64 of the pair at the other end of the armature 66 is also connected to the motor by wires 142—143. A wire 145 serves to ground the motor 14. The other terminal 64 of the first mentioned pair is connected to the wire 139 by means of a wire 144 which includes a switch 146. In the same manner the corresponding terminal of the other pair is connected to the wire 133 by a wire 148 which includes a switch 146 similar in all respects to the previously mentioned switch which was similarly numbered. The switches 146 are normally closed and are adapted to be operated to open position by movement of the cam 34 on the shaft 10. As in the previously described embodiment, the cam 34 is operable upon or before each complete revolution of the shaft 10 and could be replaced by two or more cams if operation at more frequent intervals was desired.

The wiring diagram of the alternative form shown in Fig. 7 includes a wire 150 connected at one end to the wire 130 and to the armature 66 at the other end. It will be understood that the illustration of the relay 50 and the various switches and circuit connections in this embodiment is, as stated, schematic and various modifications could be made as dictated by practical considerations in the application of the device to commercial use.

In the operation of the device shown in Fig. 7, movement of the switch blade 126 to the right by operation of the thermostatic switch 118 will cause engagement with the contact 122. A circuit through the right-hand coil 56 of the relay is established by wires 139, 138 and 136 to ground. Armature 66 is attracted to close right-hand pair of contacts associated with terminals 64 and the motor 14 is energized through wires 140, 141 to move the spindle 26 to the right pivoting the contact arm 124 and tending to separate the contact 122 from the switch blade 126. At the same time, a shunt circuit is established around the thermostatic switch 118 by wire 144, switch 146, wire 133, relay coil 56 and wire 136 to ground. The shaft 10 is rotated by operation of the motor causing longitudinal movement of the jack screw 15 to operate the shutter in the opening direction. The switch 146 in wire 144 remains closed for one revolution or less of the shaft 10 until the cam 34 moves into position to operate this switch to open position.

During this movement of the shaft 10 and before the cam has operated, the spindle 26 may move the contact arm 124 to open the contact 122 with a graduating action. When such opening movement of the switch blade 126 and contact 122 occur, the shunt previously described maintains the armature 66 in attracted position. Upon opening of the switch 146 by the cam 34, the shunt circuit is discontinued and coil 56 being deenergized the relay armature moves to neutral position.

As in the previously described embodiment, the motor 14 may be suitable to be energized by direct current and it will be apparent that the movement of the contact arm 124, as described, to open the contact 122 with a graduating action will tend to produce a slight arc between the contact 122 and switch blade 126. The arcing effect cannot produce chattering of the armature 66 due to the electrical latching of the armature in attracted position by provision of the shunt circuit which is effective upon opening of the thermostatic switch and which remains effective until rotation of the shaft 10 has proceeded far enough to render the cam 34 operative to cause opening of the switch 146. By providing two switches 146 positioned in spaced relation around the shaft 10 for operation by the cam 34 the shunt circuit becomes effective whether the control opens contact 122 or contact 120 and will maintain the motor operating in the direction set by the initial engagement of the switch blade 126 with either of the contacts. Thus, it is only after the control switch has definitely opened the motor circuit that the armature is released for movement to neutral position.

It will be understood that various changes can be made in the arrangement and combination of parts and in the details of construction herein disclosed within the scope of the appended claims without departing from the spirit of the invention.

I claim:

1. In a driving mechanism, the combination with a direct current electric motor, a control switch therefor, means for operating said switch with gradual action, of a rotatable shaft driven by said motor, an electromagnetic device for relaying current between said switch and motor, said device having an armature movable to attracted position upon operation of said switch and being subject to chattering during said gradual action, latching means operatively engageable with said armature for maintaining said armature in attracted position, means biasing said latching means toward latching position, and means operated intermittently from said shaft into operative engagement with said latching means for overcoming said biasing means to release said armature.

2. In a driving mechanism, the combination with a direct current reversible electric motor, a control switch for said motor movable to opposite operating positions, means for moving said switch with gradual action, of a rotatable shaft driven by said motor in opposite directions according to the position of said switch, an electromagnetic device for relaying current between said switch and motor, said device having an armature movable to opposite attracted positions upon operation of said switch and being subject to chattering during said gradual action, latching means operatively engageable with said armature for maintaining said armature in either attracted position, means biasing said latching means toward latching position, and means operated intermittently from said shaft in either direction thereof into operative engagement with said latching means for overcoming said biasing means to release said armature.

3. In a driving mechanism, the combination with a double-throw switch having graduating action to open and close, a motor rotatable in opposite directions controlled by said switch, of a rotatable shaft driven by said motor in opposite directions according to the position of said switch, a relay comprising spaced electromagnets and a common armature therefor energized upon closing of said switch, said armature being subject to chattering during initial operation of said switch, means upon which said armature is mounted for pivotal movement into and out of operative relation with said magnets alternatively, a pair of latching elements operatively engageable with said armature alternatively when said armature is in said operative relation, means for connecting said latching elements for joint operation, and means operated intermittently from said shaft in either direction thereof into operative engagement with said latching means for releasing said armature from said latching elements.

4. A relay comprising spaced electromagnets, a common armature for said magnets, means upon which said armature is mounted for alternative operative engagement with said magnets, a pair of latching elements movable alternatively into operative relation with opposite ends of said armature when in said operative engagement, and means for connecting said latching elements for unitary operation.

5. A relay comprising spaced electromagnets, a common armature for said magnets, means upon which said armature is mounted for alternative operative engagement with said magnets, a pair of latching elements movable alternatively into operative relation with opposite ends of said armature when in said operative engagement, means for connecting said latching elements for unitary operation, and means biasing said elements towards operative relation with said armature.

6. A relay comprising spaced electromagnets, a common armature for said magnets, means upon which said armature is mounted for alternative operative engagement with said magnets, a pair of latching elements pivotally mounted adjacent opposite ends of said armature, interengaging means on each latching element and said armature for maintaining said operative engagement with either of said magnets, said interengaging means being effective on the end of said armature having said operative engagement, a cross-arm connecting said elements for transmitting movement of one to the other, and means acting on one said element and through said cross-arm on the other for biasing said elements towards said armature.

7. A relay having a plurality of coils adapted to be alternatively energized, a pivoted relay armature common to said coils and being movable to attracted position upon energization of any one of said coils, means movable alternatively into engagement with opposite ends of said armature upon initial movement thereof to attracted position, and means for retaining said movable means and armature in engaging relation irrespective of reenergization of said coils.

8. In combination with a driving element, an element to be driven thereby, means for controlling the driving operation including an electromagnet having a movable armature, of latching means operatively engageable with said armature for mechanically restraining movement thereof, and means for operating said latching means for one of said elements.

9. In combination with a driving element, an element to be driven thereby, means for controlling the driving operation including an electromagnet having a movable armature, of latching means operatively engageable with said armature for mechanically restraining movement thereof, and connecting means operative between said driven element and said latching means for releasing the latter during the driving operation to terminate the same.

10. The combination with a control switch, a load, a source of power, relay means operative for connecting the load to the source under control of the control switch, of latching means operatively engageable with the relay means for mechanically retaining the same in operative condition after the control switch has operated to effect disconnection of the load, and connecting means operative between the load and said latching means for releasing the latter after the control switch has operated.

11. The combination with a control switch movable between positions, a load, a source of electrical energy, relay means including a coil and an armature having contacts operable thereby, of a first circuit including the source, said control switch and said relay coil effective for energizing said coil to close said contacts upon movement of said control switch to one said position, a second circuit including the source, said contacts and said load, said second circuit being effective for conneting the load to the source when said contacts are closed, latching means operatively engageable with said armature for mechanically retaining said contacts closed irrespective of subsequent deenergization of said coil when said control switch is in another position, and connecting means operative between the load and said latching means for releasing said armature to open said contacts after said control switch has moved to said other position.

12. In a driving mechanism operable from a source of electrical energy, the combination with a control switch movable between open and closed positions, a rotatable element, a relay including a coil and a pivoted armature having contacts operable thereby, of a first circuit including the source, said control switch and said relay coil effective for energizing said coil to close said contacts upon movement of said control switch to closed position, a second circuit including the source, said contacts and rotatable element, said second circuit being effective for connecting said rotatable element to the source for driving operation when said contacts are closed, latching means operatively engageable with said armature for mechanically retaining said contacts closed irrespective of subsequent deenergization of said coil when said control switch is in open position, means biasing said latching means toward latching position, and means operated intermittently from said rotatable element into operative engagement with said latching means for overcoming said biasing means to release said armature and open said contacts after said control switch has moved to open position.

13. A relay comprising a pair of spaced electromagnets, a common armature for said electromagnets, means upon which said armature is mounted intermediate the ends thereof for alternative operative engagement with said electromagnets when attracted thereby, a pair of latching elements mounted one adjacent each end of said armature, interengaging means on each latching element and said armature for maintaining said operative engagement with either of said electromagnets, said interengaging means being effective on the end of said armature having said operative engagement, and yieldable means operatively associated with said latching elements for retaining said interengaging means and armature in said operative engagement when said armature ceases to be attracted.

14. A relay comprising a frame, a pair of spaced electromagnets secured to said frame, a common armature for said electromagnets, means extending from said frame between said electromagnets upon which said armature is fulcrumed intermediate the ends thereof, said armature being adapted for pivotal movement into alternative operative engagement with said electromagnets when attracted thereby, a pair of latching elements mounted on said frame, one said element being adjacent each end of said armature, interengaging means on each latching element and said armature for maintaining said operative engagement with either of said electromagnets, said interengaging means being effective on the end of said armature having said operative engagement, yieldable means operative between said frame and said latching elements for retaining said interengaging means and armature in said operative engagement when said armature ceases to be attracted, and means carried by said frame and movable into operative engagement with latching elements for overcoming said yieldable means.

15. A relay comprising a frame, a pair of spaced electromagnets secured to said frame, a common armature for said electromagnets and biased out of operative engagement therewith, means extending from said frame between said electromagnets upon which said armature is fulcrumed intermediate the ends thereof, said armature being adapted for pivotal movement into alternative operative engagement with said electromagnets when attracted thereby sufficiently to overcome said bias, a pair of latching elements fulcrumed on said frame, one said element being adjacent each end of said armature, interengaging means on each latching element and said armature for maintaining said operative engagement with either of said electromagnets, said interengaging means being effective on the end of said armature having said operative engagement, a cross-arm connecting said latching elements for transmitting movement of one to the other, yieldable means operative between said frame and one said latching element for retaining said interengaging means and armature in said operative engagement when said armature ceases to be attracted, and means carried by said frame and movable into operative engagement with said one latching element for overcoming said yieldable means.

VICTOR WEBER.

REFERENCES CITED

The following references are of record in the file of this patent:

UNITED STATES PATENTS

| Number | Name | Date |
|---|---|---|
| 1,971,199 | Owens | Aug. 21, 1934 |
| 1,983,429 | Albright | Dec. 4, 1934 |
| 2,016,448 | Milne | Oct. 8, 1935 |
| 2,077,086 | Adair | Apr. 13, 1937 |
| 2,178,479 | Lamb | Oct. 31, 1939 |
| 2,179,349 | Pennow | Nov. 7, 1939 |